United States Patent Office 3,625,740
Patented Dec. 7, 1971

3,625,740
PROCESS FOR COATING AN ALPHA-ALUMINA
BODY WITH AN EPOXY RESIN
George F. Hurley, Acton, Mass., assignor to Tyco
Laboratories, Inc., Waltham, Mass.
No Drawing. Filed Mar. 24, 1970, Ser. No. 22,393
Int. Cl. B44d 1/092; B32b 27/38
U.S. Cl. 117—47 R
11 Claims

ABSTRACT OF THE DISCLOSURE

Improved sapphire reinforced epoxy composites and method of making same. The sapphire reinforcing elements are coated with an organic silane to promote adhesion between the sapphire elements and the epoxy matrix. Absorption of the silane by the sapphire reinforcing elements is achieved by contacting the sapphire elements with a nonaqueous solution comprising the silane and an acid.

---

This invention relates to the production of composite materials and more particularly to composites consisting of sapphire filaments in a plastic matrix.

As used in the art the term "composite material" designates a material comprising a plastic or metal alloy matrix reinforced with metal, glass or inorganic oxide fibers or filaments. Such materials, exemplified by plastics loaded with boron or glass filaments, offer the advantage of increased strength with decreased density and, are useful, for example, in fabricating parts for airborne equipment. Sapphire, i.e., monocrystalline aluminum oxide having the corundum structure, is one of the most attractive of the inorganic oxides because of its high modulus and theoretical strength (about $67.5 \times 10^6$ and $3 \times 10^6$ p.s.i. respectively) and its excellent strength to weight ratio.

In the typical composite the filaments have a tensile strength greater than that of the matrix and the function of the matrix is to bind the filaments and to transmit the applied stress from one filament to another. When a composite is subjected to tension, a shear force equal in direction and proportional in magnitude to the applied tensile force is generated at the matrix-filament interface. If the matrix-filament bond is not uniform and does not exceed a demonstrable minimum adhesive strength, the composite cannot approach a rule of mixtures strength equal to the volume fraction of filaments times their strengths plus the volume fractions of resins times the resin strength.

Heretofore, it has not been possible to make high strength composites consisting of sapphire filaments in a plastic matrix. The lack of success has been due in part to the inability of the selected resin composition to readily wet the sapphire, an essential precursor to satisfactory filament-matrix bonding.

Accordingly, the primary object of this invention is to provide an improved composite material consisting of sapphire filaments embedded in a plastic matrix.

A second primary object of the invention is to provide a novel method for increasing the wettability of sapphire by a selected resin so as to promote adhesion between the two constituents and to eliminate entrapped bubbles at the matrix-filament interfaces.

A more particular object is to provide sapphire parts with a coating that improves the interface behavior of sapphire and epoxy resins, whereby to obtain improved adhesion for composite fabrication and also to provide a measure of mechanical protection during shipping and handling.

Described briefly, the invention whereby the foregoing object and other objects which are hereinafter described or rendered apparent are achieved comprises coating sapphire elements with an organic silane which promotes adhesion with an epoxy resin matrix. Further features and advantages of the invention are set forth in the following detailed description.

As used herein the terms "sapphire reinforcing elements" and "sapphire bodies" are intended to denote and encompass essentially monocrystalline alpha-alumina in various shapes, including elongate filaments, fibers, rods, ribbons, tubes, etc. It is essential to note that the particular shape of the sapphire element is not critical to the practice of this invention but that elongate sapphire filaments are preferred in making composite materials intended for the fabrication of structural components. Also, as used herein, the term "monocrystalline" includes sapphire elements that usually consist of a single crystal or a bicrystal but may contain as many as three or four single crystals.

The method of this invention comprises subjecting selected sapphire elements to a pre-cleaning treatment to remove moisture and surface impurities, and then contacting the cleaned elements with a solution of a selected silane under selected temperature conditions whereby the silane is adsorbed by and bonds to the elements. Thereafter the sapphire parts are removed from the silane environment, dried and then coated with a thin layer of an epoxy resin for mechanical protection or used directly to make a composite. The application of the silane coating must be conducted under dry conditions, i.e., in the absence of moisture, in order to get an adherent silane coating. Sapphire parts coated with silane as herein described exhibit improved wettability by epoxy resins, thereby facilitating the production of epoxy composites with superior mechanical properties. The exact reason for the superior properties exhibited by epoxy composites comprising sapphire reinforcing elements pre-coated with a silane as herein described is not completely understood, except that the silane coating is known to clearly improve the wettability of the elements by the epoxy matrix.

The following example illustrates the preferred mode of practicing the invention.

EXAMPLE I

A plurality of monocrystalline sapphire filaments (6.5 inches long and with diameters in the range of 11 to $11.4 \times 10^{-3}$ inch) are cleaned by immersion in acetone. Then they are placed in an elongate quartz cell and end pieces comprising Pyrex glass stop cocks mated to Pyrex glass joints are attached to the opposite ends of the glass cell. Thereafter the stop cocks are opened and the cell is flushed with argon. Then the cell is placed in a muffle-type furnace and heated to a temperature of approximately 700° C. for one hour. During this baking cycle argon is continuously passed through the cell. Then the stop cocks are closed and the cell removed from the furnace and allowed to cool to a temperature of 25°–50° C. The cooling causes the residual argon in the cell to contract, creating a partial vacuum which is used to draw a silane solution into the cell. Sufficient solution is drawn into the cell for all of the sapphire filaments to be immersed therein. Thereafter the chamber is supplied with heat sufficient to keep it at a temperature of 50°–55° C. for a period of approximately one hour. The silane solution consists of one milliliter of gamma-glycidoxy propyltrimethoxy silane in 100 milliliters of alpha chloronaphthalene, plus .031 milliliter of glacial acetic acid. At the end of the one hour period, the sapphire filaments are removed from the cell and washed in acetone and dried by exposure to room temperature air. Thereafter the filaments are placed in a mold in a plurality of vertically spaced horizontally-extending rows, with all of them extending in the same direction. The mold is then filled with an epoxy resin-hardener mixture in which the epoxy resin is the reaction product of epichlorohydrin and bisphenol A and the hardener is diethylaminopropylamine (or other hardener known in the art which provides relatively fast curing at the selected curing temperature). The mold and filaments are preheated to 50° C. and kept at that temperature during addition of the epoxy resin-hardener mixture. Then the mold is heated to a temperature of about 80°–90° C. for about two hours until the epoxy resin has set and then baked at 110° C. for one hour to complete curing. The composite is separated from the mold and cut into appropriate specimen sizes for testing.

A modification of the process just described is set forth in Example II below, using the same apparatus as in Example I.

EXAMPLE II

A plurality of sapphire ribbons (measuring approximately .150 x .010 x 6 inch) are cleaned by immersing them in a mixture of nitric and sulfuric acids to remove oxidizable impurities and then dried in acetone. The ribbons are then placed in the quartz cell which is sealed and then flushed with dry argon gas. Then the cell is placed in the muffle furnace and heated to a temperature of about 700° C. for about one hour under flowing argon. Then following the same procedure as in Example I, the cell is cooled and a selected silane solution is drawn into the cell. In this case the solution consists of one ml. of beta-3,4 (epoxycyclohexyl) ethyltrimethoxysilane dissolved in 100 ml. of alpha chloronaphthalene and .030 ml. of glacial acetic acid. The cell then is reheated to a temperature of about 50°–55° C. for about one hour. Thereafter the silane solution is drained off and the sapphire ribbons rinsed in acetone and dried. Then the filaments are used to make a composite following the same procedure of Example I.

Of course, various epoxy resins and hardeners may be used in the practice of this invention. By way of example, the resin may be formed from homologs of bisphenol A, e.g., diphenols and glycols, and/or may be converted to the solid state by the addition of diethylenetriamine, m-phenylenediamine, bibasic acid anhydrides, and other agents well known in the art. A preferred resin-hardener system is the one consisting of Bakelite Epoxy No. 2256 and hardener ZZL0820 (both products of Union Carbide Co.) mixed in the ratio of about 100:27 by weight. The choice of epoxy resin and hardener does not appear to be critical with respect to the ability to form uniform bonding between the resin matrix and the silane coated sapphire elements.

Various organic silanes also may be used in the practice of this invention. By way of example but not limitation, in addition to the particular silanes of Examples I and II, the invention has been practiced with gamma-aminopropyltriethoxysilane and gamma-chloropropyltrimethoxysilane dissolved in α-chloronaphthalene or other suitable non-polar organic solvent. It is to be noted that α-chloronaphthalene functions solely as a solvent and is not adsorbed by the sapphire.

Addition of acetic acid to the silane solution has been found to promote the formation of a uniform adsorbed coating of silane on the sapphire. Although the exact function of the acetic acid is not known for certain, it is believed that formation of a silane coating on the sapphire elements involves silane hydrolysis and that the acetic acid catalyzes the hydrolysis reaction. In this connection it is to be noted also that the coating process as above described excludes or minimizes moisture on or in the vicinity of the sapphire elements. This is a significant aspect of the invention because experiments conducted with silane solutions in water rather than a non-polar organic solvent resulted in poor silane adsorption by sapphire and, consequently, poor wetting by epoxy resins and weak composites.

Of course the temperature and times mentioned in the foregoing examples may be varied depending upon the type and concentration of silane solution and type of epoxy resin-hardener system used. The essential concept of the invention is coating sapphire parts with a thin film of an organic silane which acts as a coupler to promote adhesion between the sapphire and epoxies.

A notable feature of this invention is that it permits sapphire elements to be given a thin protective epoxy layer which protects them from mechanical damage during shipping or handling and throughout the process of incorporating them into a plastic composite. Thus, after they are provided with their silane coating, each sapphire part may be given a thin coating of epoxy-hardener mixture, applied by dipping or spraying or other suitable way, and this thin coating heated so as to set. Subsequently the parts so treated may be incorporated into a plastic composite using as a matrix material an epoxy resin or some other resin that is compatible with and adheres well to epoxy resins.

Composites made in accordance with this invention exhibit improved strengths. By way of example, a plurality of test specimens were produced according to Example I using Bakelite Epoxy No. 2256 and hardener ZZL0820 mixed in the ratio of 100:27 by weight. The specimens measured 0.25 x 0.08 x 2 in. and contained 50 vol percent sapphire filaments. These specimens were found to have fracture strengths in the range of 215,000–230,000 p.s.i. when subjected to standard three-point bending tests.

Although α-chloronaphthalene is preferred as the solvent for the organic silanes used in the practice of this invention other non-aqueous solvents for organic silanes also are known to persons skilled in the art and may be used in place of α-chloronaphthalene, e.g., benzene.

It also is to be noted that although acetic acid is preferred for promoting adherence of organic silanes to α-alumina, other acids or bases that hydrolyze silanes may be used in place of acetic acid. The amount of acetic acid may be varied but preferably the mole ratio of acetic acid to silane should be kept to within about 1:15 to about 1:8, and more preferably about 1:10.

While the invention as above-described provides improved composites using sapphire reinforcing elements, it is to be understood that it may be practiced with polycrystalline α-alumina reinforcing elements, e.g., elements made of General Electric's Lucalox or Coors Porcelain Co.'s Coralox. While composites made with polycrystalline α-alumina reinforcing elements are not as strong as those made with sapphire, they are improved by coating the reinforcing elements with a silane as herein taught.

What is claimed is:

1. A process for coating an alpha-alumina body to increase its wettability by epoxy resins comprising:
   removing moisture and other impurities from the surfaces of said body, contacting said body with a non-aqueous solution of an organic silane and acetic acid in a non-polar organic solvent for a period of time sufficient for said silane to be adsorbed by and bound to said surfaces, and removing said body from said solution.

2. The process of claim 1 wherein said body is sapphire.

3. The process of claim 1 wherein said silane is a member of the group consisting of gamma-glycidoxy propyltrimethoxy silane, beta-3,4-(epoxycyclohexyl) ethyltrimethoxysilane, gamma - aminopropyltriethoxysilane, and gamma-chloropropyltrimethoxysilane.

4. The process of claim 1 wherein said silane is gamma-glycidoxy propyltrimethoxy silane.

5. The process of claim 1 wherein said solvent is alpha-chloronaphthalene.

6. Process of claim 1 wherein the mole ratio of acetic acid to silane is between about 1:15 to about 1:8.

7. A method of coating an alpha-alumina body with an epoxy resin comprising removing moisture and impurities from the surface of said body, adsorbing a thin adherent organic silane film on said surface by contacting said surface with a nonaqueous solution of an organic silane in a non-polar organic solvent containing an acid capable of hydrolyzing said silane, coating said film with an epoxy resin-hardener mixture, and curing said coating.

8. The method of claim 7 wherein said body is a sapphire body.

9. Method of claim 7 wherein said carboxylic acid is acetic acid.

10. Method of claim 7 wherein said silane is gamma-glycidoxy propyltrimethoxy silane.

11. A process for coating a sapphire body to increase its wettability by epoxy resins comprising: removing moisture from the surface of said body, contacting said body with a non-aqueous solution consisting of an organic silane, an acid or base capable of hydrolyzing said silane, and a non-polar organic solvent for a period of time sufficient for said silane to be adsorbed by and bound to said surfaces, and thereafter terminating contact of said body and said solution.

References Cited

UNITED STATES PATENTS

| | | | |
|---|---|---|---|
| 3,455,725 | 7/1969 | Jex et al. | 117—123 D X |
| 3,537,882 | 11/1970 | Wiggill | 117—72 |
| 2,951,782 | 9/1960 | Eilerman | 117—72 X |
| 3,424,434 | 1/1969 | Palfreyman et al. | 253—77 |
| 3,116,161 | 12/1963 | Purnell | 117—123 C X |
| 3,472,729 | 10/1969 | Sterman et al. | 117—126 GS X |

OTHER REFERENCES

Rauch et al.: Ceramic Fibers and Fibrous Composite Materials, Academic Press, New York, 1968, page 70.

WILLIAM D. MARTIN, Primary Examiner

R. HUSACK, Assistant Examiner

U.S. Cl. X.R.

117—72, 76 T, 119, 121; 161—170